Jan. 16, 1968 G. BORGEAUD 3,363,585
LOCOMOTIVE TRUCK
Filed March 23, 1965 3 Sheets-Sheet 2

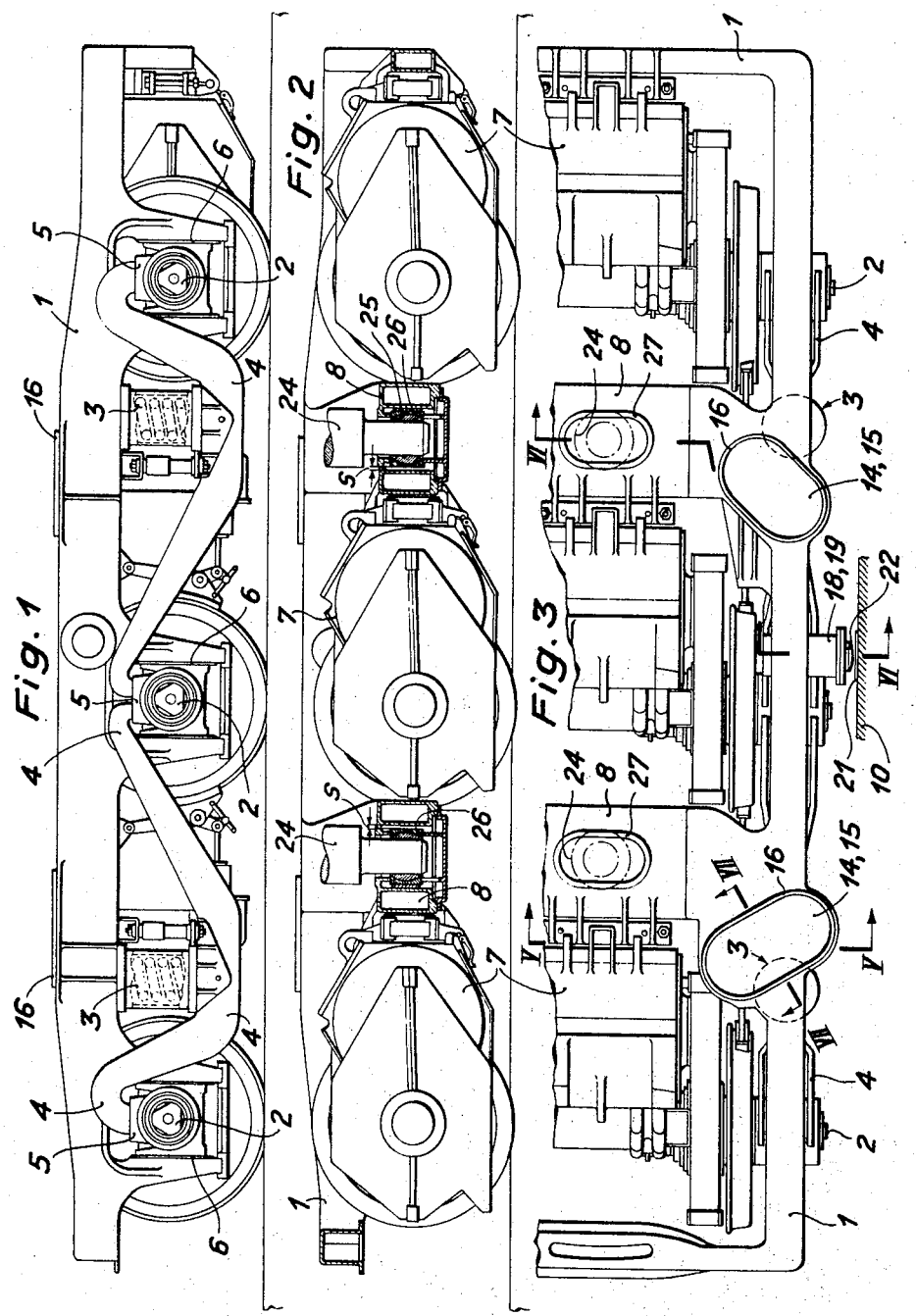

*Inventor:*
Gaston Borgeaud
BY Pennie, Edmonds,
Morton, Taylor and Adams
ATTORNEYS

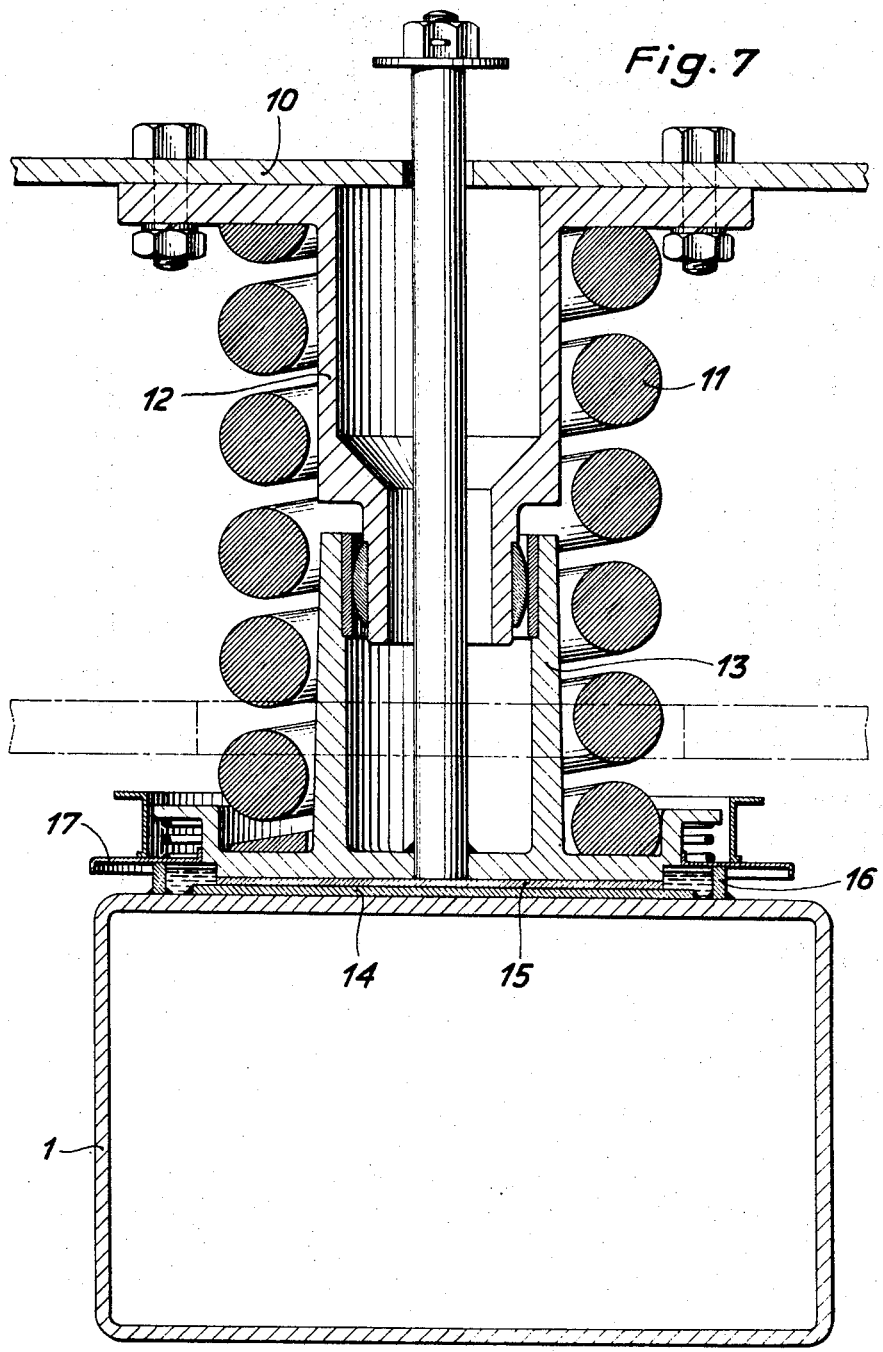

United States Patent Office 3,363,585
Patented Jan. 16, 1968

3,363,585
LOCOMOTIVE TRUCK
Gaston Borgeaud, Winterthur, Switzerland, assignor to Sulzer Brothers Limited, Winterthur, Switzerland, a Swiss company
Filed Mar. 23, 1965, Ser. No. 441,959
Claims priority, application Switzerland, Jan. 22, 1965, 959/65
7 Claims. (Cl. 105—172)

ABSTRACT OF THE DISCLOSURE

There is disclosed a three-axle locomotive truck having a separate motor on each axle and a coupling of that truck to the locomotive frame, the coupling comprising four resiliently borne stud-like members in the locomotive frame which rest in pans on the truck for support of that share of the locomotive body weight to be borne by the truck, resilient side buffers between the truck and locomotive frame for restoration of the truck and frame to an intermediate relative lateral position after departures therefrom, and means for transfer of tractive and braking effort stresses longitudinal of the locomotive between the truck and frame. These means comprise a pair of studs depending from and spaced longitudinally of the locomotive frame which engage slots in two transverse members disposed longitudinally of the truck, the spacing on centers of the studs being greater than the spacing on centers of the slots. In consequence a stress exerted by the truck on the locomotive frame in either longitudinal sense is transferred from the truck to the locomotive frame or vice versa at the stud and slot connection which is trailing in the sense of that stress.

Summary of the invention

The present invention pertains to locomotives having plural-axle trucks. The invention provides a locomotive of this type including resilient support members which so support the locomotive frame on the trucks as to permit rotational motion of the trucks in substantially horizontal planes and also parallel translational motions thereof crosswise of the axes of rotation about which those rotational motions occur. The locomotive of the invention also includes elastic restoring members which operate crosswise of the longitudinal locomotive axis to restore the trucks to their middle position after such transverse motions. It also includes truck-to-locomotive-frame draft coupling gear provided in pairs for each truck, each pair including two members of which one is fixed in the truck and the other in the locomotive frame. The two members of each pair may be moved relatively to each other without interrupting stress transfer between them, so as to accommodate the relative truck-frame motions above referred to. The stress transfer point of each pair is preferably disposed at approximately the height of the truck axles, and in a preferred embodiment of the invention employing three-axle trucks, the two pairs for each truck are disposed one between one end axle and the middle axle, and the other between the middle axle and the other end axle. This coupling gear so transfers the stresses between the truck and the locomotive frame that the tractive effort is borne by the rear pair of members and the braking effort by the front one, front and rear being identified in accordance with the sense of motion of the locomotive.

Brief description of the drawing

The invention will now be further described with reference to the accompanying drawings wherein a nonlimitative example of the invention is illustrated as applied to a C+C type electric or Diesel-electric locomotive. In these drawings:

FIG. 1 is a view in side elevation of one of the trucks of a locomotive according to the invention;
FIG. 2 is a vertical longitudinal section of the truck of FIG. 1, the section plane of FIG. 2 being parallel to the section plane of FIG. 1 but midway between the wheels of the truck;
FIG. 3 is a fragmentary plan view of the truck of FIGS. 1 and 2;
FIG. 7 is a sectional view taken on the line VII—VII of FIG. 3.

Description of the preferred embodiment

Figure 4:
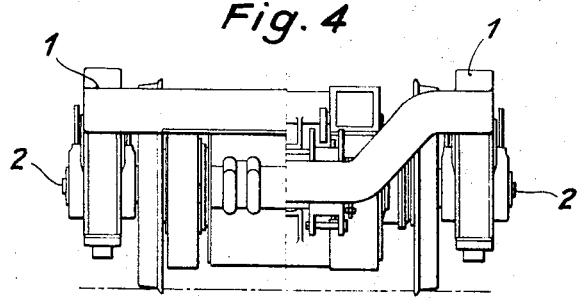
FIG. 4 is a fragmentary front elevational view of the truck.
Figure 5:
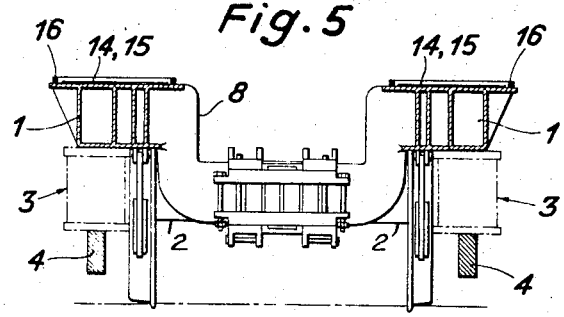
FIG. 5 is a sectional view taken on the line V—V of FIG. 3.

The frame 1 of the truck is borne by the three axles 2 via coil springs 3 and equalizing members 4 resting on the journal boxes 5. The frame moreover engages the journal boxes at vertically sliding guides 6. The individual axles are driven by means of nose-suspended traction motors 7 which are resiliently supported at the right ends thereof by individual transverse members 8 in the truck frame.

Figure 6:
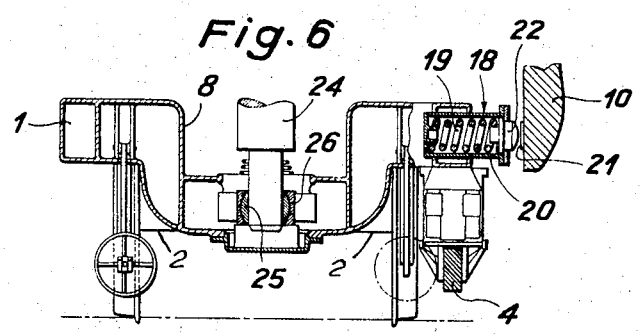
FIG. 6 is a section taken on the line VI—VI of FIG. 3.

The locomotive frame, schematically indicated at 10 in FIG. 7, rests on each of the trucks through four resilient supports reposing on the truck frame. These resilient supports are shown at a larger scale in FIG. 7. Each comprises a coil spring 11 and a pair of guide members 12 and 13. The guide members 12 are disposed in pairs attached to transverse members of the locomotive frame and engage the lower guide members 13 in telescopic fashion. The latter are widened at the bottom thereof and rest on bearing surfaces which may include bronze friction-reducing linings 14 on the truck and 15 on the member 13. The bearing surfaces 14 are as indicated in FIG. 3 disposed on longitudinal beams of the truck. Each is located within a pan 16 which contains lubricating oil and which is totally enclosed by means of a movable and flexible cover 17. The bearing surfaces themselves are of circularly arcuate shape and are provided with a width sufficient to permit transverse as well as longitudinal motions of the guide members 13 with respect to the trucks. The locomotive frame is thus permitted to execute transverse motions with respect to the truck. After such motions it is restored to a central position with respect to the trucks by means of the restoring devices 18, one on each side of each truck. These devices, illustrated in section in FIG. 6, comprise each a coil spring 19 which is enclosed in prestressed condition in a spring housing 20 affixed to the truck. For cooperation therewith there is provided on the locomotive frame a lateral abutment surface 21 which has small clearance from a buffer 22 in the outer end of spring 19. Upon lateral shift of the locomotive frame these buffers are engaged by the locomotive frame, and the resultant further compression of the coil springs exerts strong restoring forces on the locomotive frame, even for very small lateral displacements of the latter. In this way, by means of the four resilient supports 11–13 and the two lateral restoring devices 18–22, there is provided a so-called "swing bolster" which makes possible a resilient support of the locomotive frame on the trucks with freedom for lateral motion and provision for restoration to central position.

For transmission of tractive and braking effort from each truck to the locomotive frame there are provided two studs 24 (FIG. 6) which are fastened to the locomotive frame and which engage the two transverse truck frame members 8 in the vicinity of the axle height. The studs are provided with male spherical bearing surfaces 25 and with female spherical guide shoes 26, and by means thereof are guided in transverse slots 27 of the transverse truck members 8 (FIG. 3). Each stud 24 thus constitutes with the transverse truck member 8 (and more particularly with the portion of that member 8 bounding the slot 27 therein) a pair of interengaging members, the stud 24 being a male member and the member 8 being a female member, one of these members being disposed in the frame and the other in the truck. These studs thus carry no weight and serve only for transmission of the tractive and braking forces. In respect of lateral forces the locomotive frame is, as already indicated, guided exclusively by means of the restoring devices 18, 19, 20, 22 and the corresponding abutment elements 21. With this arrangement, the central part of the truck remains open and consequently leaves ample space and wide flexibility for the mounting of the traction motors.

The mutual positioning of the guide shoes 26 and slots 27 is such that at any one time only one of the studs 24 is employed in transmission of longitudinal stresses. Specifically, as seen in FIG. 2, the guide shoes 26 are each spaced by a distance s from the side of their respective slots 27 which is adjacent the middle of the truck, whereas on the opposite side of the slots 27 there is provided only so much play or clearance as is necessary to avoid binding. That is to say, the spacing on centers of the studs 24 in the locomotive frame 10 is larger than the spacing on centers of the slots 27 in the truck frame 10, so that clearances s between the guide shoes 26 and the limits of the slots 27 adjacent the middle are larger than the clearances between the shoes 26 and the limits of slots 27 adjacent the end axles. Consequently, the point of attack for stress transfer is in the case of tractive stresses always behind the middle of the truck, whereas in the case of braking stresses it is always in front thereof.

Let it be assumed for example that the motors are energized to drive the truck to the left in FIG. 2. The tractive effort will be transferred to the locomotive frame at the right-hand side of the right-hand stud 24 while a large clearance s will be maintained to the right of the left-hand stud 24 and a small clearance will be maintained at the left thereof. For motion of the locomotive to the left, braking effort will be transferred to the locomotive frame at the left of the left-hand stud 24, while a relatively large clearance s will be maintained at the left of the right-hand stud 24, and a small clearance will exist at the right thereof. In this way there is provided equilibrium of the longitudinal stresses exerted on the truck. This feature contributes significantly to good running characteristics over the road.

The invention thus provides a locomotive comprising a frame and, in practice, a plurality of plural-axle trucks. For each truck there are provided means, such as the four sets of members 11, 12 and 13, to support part of the weight of the frame on the truck while permitting limited rotation and translation of the truck relative to the frame. The members 13 rest on bearing plates disposed in pans for the reception of lubricant. In addition, there are provided for each truck plural two-part resilient interengaging means, each supported in part on the frame and in part on the truck for the exertion of horizontal stresses in order to effect restoration of the truck and frame to an intermediate relative transverse position upon relative translations of the truck and frame. Each of these two-part means comprises in the embodiment described the pre-stressed spring 18 with its buffer 22 in the truck and the abutment surface 21 in the frame. For each truck there is also provided truck-frame coupling gear for the transmission between truck and frame of stresses generally longitudinal of the frame. This coupling gear comprises two pairs of inter-engaging members such as, for each pair, the stud 24 in the frame and the slotted transverse member 8 in the truck of the embodiment hereinabove described. The two pairs are spaced longitudinally of the frame as shown in FIG. 2 of the drawings and the spacing of the studs 24 on the frame is larger than the spacing of the slots 27 in the members 8 on the struck so that for either sense of truck-frame stress longitudinally of the locomotive, such stress is transferred at the pair of members 8, 24 adjacent the trailing end of the truck. The studs 24 and transverse truck members 8 engage each other approximately at the height of the truck axles.

While the invention has been described in terms of a preferred embodiment, the invention itself is not limited thereto but comprises rather all modifications thereof falling within the spirit and scope of the appended claims.

I claim:

1. A locomotive comprising a frame, a plural-axle truck, means to support at least part of the weight of the frame on the truck while permitting limited rotation and translation of the truck relative to the frame, plural two-part resilient interengaging means each supported in part on the frame and in part on the truck for restoration of the truck and frame to an intermediate relative transverse position upon relative translations of the truck and frame, and truck-frame coupling gear for the transmission between truck and frame of only those stresses which are generally longitudinal of the frame, said coupling gear comprising two pairs of interengaging members, one member of each pair being a male member and the other being a female member, one member of each pair being disposed in the frame and the other in the truck, the members of each pair engaging each other substantially at the height of the axles of said truck said pairs being spaced longitudinally of the frame, the spacing of the male members being larger than the spacing of the female members, whereby for either sense of truck-frame stress longitudinally of the locomotive, such stress is transferred at the pair adjacent the trailing end of the truck.

2. A locomotive according to claim 1 wherein said support means comprise a plurality of guide members resiliently supported in the frame and a plurality of bearing plates disposed in the truck for receipt of said guide members.

3. A locomotive according to claim 2 wherein said bearing plates are disposed at the bottom of pans for the reception of lubricant.

4. A locomotive according to claim 1 wherein the parts of said plural two-parts resilient interengaging means engage each other for transmission of horizontal stresses transversely of the frame upon departure of the frame and truck from said intermediate relative transverse position.

5. A locomotive according to claim 4 wherein one part of each of said interengaging means is a pre-stressed resilient member exerting a stress corresponding to its pre-stressed condition upon engagement with the other part of such means.

6. A locomotive comprising a frame, a plural-axle truck, means to support at least part of the weight of the frame on the truck while permitting limited rotation and translation of the truck relative to the frame, plural two-part resilient interengaging means each supported in part on the frame and in part on the truck for restoration of the truck and frame to an intermediate relative transverse position upon relative translations of the truck and frame, and truck-frame coupling gear for the transmission between truck and frame of only those stresses which are generally longitudinal of the frame, said coupling gear comprising two studs extending downwardly from the locomotive frame at positions spaced from each other longitudinally of the frame and between the leading and trailing axles of the truck, said coupling gear further comprising two members extending transversely of the truck, said members being slotted to receive said studs and the spacing on centers of said slots being smaller than the spacing on centers of said studs, said studs and members engaging each other substantially at the height of said axles.

7. A locomotive according to claim 6 wherein said studs engage said transversely extending members approximately at the height of the truck axles.

References Cited

UNITED STATES PATENTS

| | | | |
|---|---|---|---|
| 1,488,451 | 3/1924 | Laughlin | 105—199 |
| 1,895,500 | 1/1933 | Todd | 105—200 |
| 2,074,340 | 3/1937 | Piron | 105—199 |
| 2,241,757 | 5/1941 | Baade | 105—192 |
| 2,481,695 | 9/1949 | Scott | 308—137 |
| 2,703,057 | 3/1955 | Wintemberg | 105—199 |
| 2,797,650 | 7/1957 | Ross et al. | 105—199 |
| 3,288,083 | 11/1966 | Jones | 105—172 |

FOREIGN PATENTS 271,125   3/1914   Linke et al.

ARTHUR L. LA POINT, *Primary Examiner.*

H. BELTRAN, *Assistant Examiner.*